United States Patent
Davis, Jr.

(10) Patent No.: US 6,669,163 B2
(45) Date of Patent: Dec. 30, 2003

(54) SUPPORT APPARATUS AND GROUNDED EQUIPMENT FRAME

(75) Inventor: Wilman E. Davis, Jr., Bardstown, KY (US)

(73) Assignee: Universal Support Systems LLC, Bardstown, KY (US)

(*) Notice: Subject to any disclaimer, the term of this patent is extended or adjusted under 35 U.S.C. 154(b) by 0 days.

(21) Appl. No.: 09/792,564

(22) Filed: Feb. 23, 2001

(65) Prior Publication Data

US 2002/0109055 A1 Aug. 15, 2002

Related U.S. Application Data

(63) Continuation-in-part of application No. 09/488,111, filed on Jan. 20, 2000, now abandoned.

(51) Int. Cl.[7] ................................................. E04B 1/00
(52) U.S. Cl. .......................... 248/396.01; 248/346.01; 248/188.1; 52/263; 52/126.5
(58) Field of Search ................. 248/346.01, 346.03, 248/519, 188.7, 188.1, 188.2; 52/263, 126.5, 126.6

(56) References Cited

U.S. PATENT DOCUMENTS

| | | | |
|---|---|---|---|
| 401,380 A | 4/1889 | Sammons | |
| 3,318,057 A * | 5/1967 | Norsworthy | 52/126 |
| 3,681,882 A * | 8/1972 | Bettinger | 52/126 |
| 3,811,237 A * | 5/1974 | Bettinger | 52/126 |
| 3,844,440 A * | 10/1974 | Hadfield et al. | 220/3.7 |
| 4,033,081 A | 7/1977 | Perkins | |
| D269,571 S | 7/1983 | Geshwind | |
| 4,546,580 A | 10/1985 | Ueno | |
| 4,558,544 A * | 12/1985 | Albrecht et al. | 52/126.6 |
| 4,591,126 A | 5/1986 | Berney | |
| 4,807,720 A | 2/1989 | Kim | |
| 4,850,162 A * | 7/1989 | Albrecht | 52/126.6 |
| 4,905,437 A | 3/1990 | Heather | |
| 5,217,191 A | 6/1993 | Smith | |
| 5,588,264 A * | 12/1996 | Buzon | 52/126.6 |
| 5,628,157 A * | 5/1997 | Chen | 52/263 |
| 5,685,508 A | 11/1997 | Smith | |
| 5,708,889 A | 1/1998 | Speggiorin | |
| 5,816,554 A * | 10/1998 | McCracken | 248/346.01 |
| 5,829,718 A | 11/1998 | Smith | |
| 5,936,825 A * | 8/1999 | DuPont | 361/127 |
| 5,953,870 A * | 9/1999 | Jette | 52/220.1 |
| D435,430 S | 12/2000 | Valentz | |
| 6,332,292 B1 * | 12/2001 | Buzon | 52/126.6 |
| 6,347,479 B1 * | 2/2002 | Greenberg et al. | 47/48.5 |
| 6,363,685 B1 * | 4/2002 | Kugler | 52/745.05 |

\* cited by examiner

Primary Examiner—Leslie A. Braun
Assistant Examiner—Steven Marsh
(74) Attorney, Agent, or Firm—Charles Lee Thompson

(57) ABSTRACT

Support apparatus including a base, a receptacle for receiving an object, and a plurality of spaced apart buttresses connected to the base and to the receptacle, the buttresses mounting the receptacle perpendicularly with respect to the base and spaced outwardly therefrom to cause force received by the receptacle from supporting the object to be transferred and distributed to different portions of the base by the buttresses. The support may be grounded to ground supported objects.

6 Claims, 9 Drawing Sheets

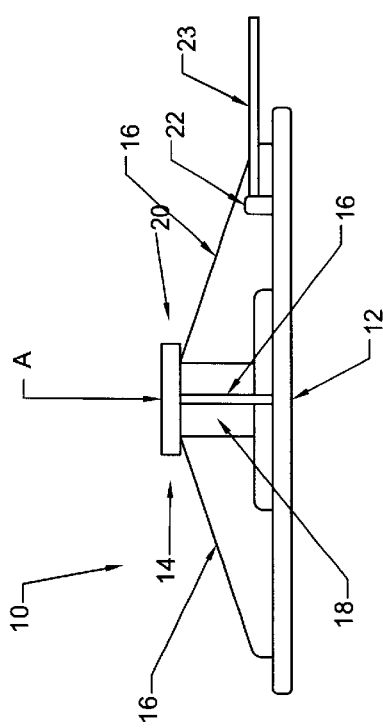
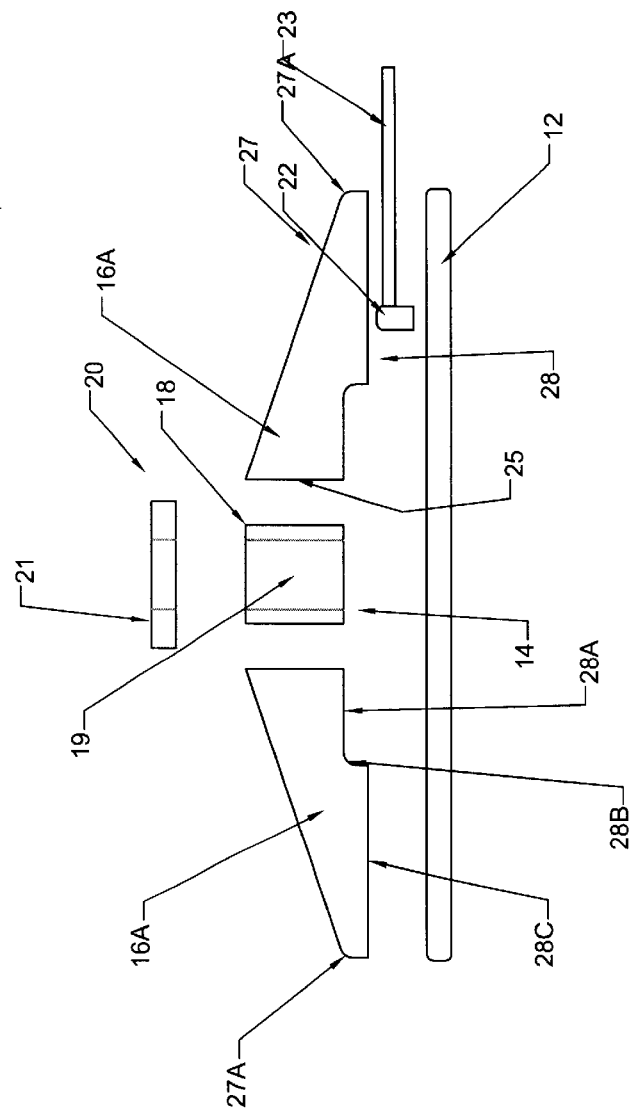

SUPPORT APPARATUS AND GROUNDED EQUIPMENT FRAME

CROSS-REFERENCE TO RELATED APPLICATION

This is a continuation-in-part of application Ser. No. 09/488,111, filed Jan. 20, 2000, now abandoned.

FIELD OF THE INVENTION

This invention relates generally to support apparatus. More particularly, this invention relates to support apparatus particularly useful, by way of example and not by way of limitation, for supporting equipment typically found on the top of a building, or in direct contact with the ground. Still more particularly, this invention relates to support apparatus, which may be grounded to provide a ground for the supported equipment.

BACKGROUND OF THE INVENTION

Telecommunication receivers/transmitters, and other equipment, radio broadcasting equipment, antennae, wave guides, falling-ice guards, walkways, electric wiring raceways, heating/cooling equipment, ductwork, piping, and other equipment are commonly located on the tops or roofs of buildings. Support apparatus are required to support such equipment on the building roofs or tops and preferably the support apparatus distributes the weight or load from such equipment over more than one area or location to prevent the occurrence of point loads with their attendant localized stresses which can cause damage to the building roof systems or tops. Further such equipment may require grounding to protect the equipment against lightning strikes or other transient high-voltage power surges produced by or to which the equipment may be subjected. Further, equipment in need of support, or in need of support and grounding, may be located beside buildings, on top of water tanks, or on raw land sites, at petrochemical plants, offshore drilling rig platforms, electrical transformer locations, highway lighting installations, satellite uplink and downlink stations. Additionally, support apparatus, which may or may not be grounded, is needed for supporting oil, gas and water pipes, acid carrying pipes, dry powder conveying apparatus, high and low voltage electrical transmission lines and chemical lines. The above is set forth merely by way of example and should not be construed as limiting the application of the support apparatus of the present invention.

Importantly, groundable support apparatus are needed to connect the supported equipment directly to a ground field, ground leads, or ground rods to create an equi-potential ground field. This is particularly useful in protecting the supported equipment against the above-noted lightning strikes or other transient high voltage power surges. Further, support apparatus are needed to support equipment of the type noted generally above which allows the supported equipment to expand or move due to thermal expansion, wind forces, water loading such as water flowing over a roof, and which support apparatus can support such equipment without causing damage to the roof membrane upon which the support apparatus resides or the underlying insulating material, such as in the above-noted building roofing systems.

As is further known, the telecommunication industry is currently engaged in installing innumerable transmission and receiving sites across the United States and worldwide. Typically these sites involve the construction of a tower with antennae attached to receive and send cellular and digital signals. The tower holds the actual antennae connected by wires and cabling to the transmission and broadcasting equipment located at the base of the tower. In many instances, multiple antennae will be attached to a singular tower, each requiring its own cabling, transmission and broadcasting equipment, and associated tower cabinets. Such transmission and broadcasting equipment, and their associated power cabinets, battery back-up cabinets and electrical switchgear, are typically mounted on a steel platform attached to a concrete pier or base. Support apparatus of the type noted above are needed to support this equipment and additional equipment may be used to provide a ground for such equipment if desired or required.

As is further known, commonly on commercial buildings or on raw land sites for new equipment installations and co-locations of equipment on rooftops and raw land sites can be structures upon which the above-noted telecommunication transmission and receiving equipment is installed. Such equipment is typically subjected to various elements, forces and stresses. These forces over time may damage the equipment itself or the surface structures if no counter measures are taken. Equipment that is placed on the ground or fastened to concrete slabs is subjected to faulty grounding technique, ambient temperature retention, and degradation of the cabinets caused by ponding water. Some of the forces that affect roof top equipment include thermal expansion and cooling cycles, building deflection, wind loading, and loading and stress forces associated with rain, snow and ice. In particular, problems can arise when apparatus supporting such equipment is permanently attached to the roof, such as by the use of screws or similar penetrating devices, or by adhering it directly to the roof membrane with adhesives. Over time, the combination of relative motion due to various external forces and differences in coefficients of thermal expansion between the roof and the apparatus supporting such equipment can result in the breakdown of the roof or roof support system. Re-roofing practices are made difficult with equipment that is fixed or attached to the rooftop. Support apparatus for such equipment is needed to overcome this equipment support problem.

SUMMARY OF THE INVENTION

The support apparatus of the present invention satisfies the support apparatus needs noted above for grounding and supporting equipment of the types noted above and also the support apparatus of the present invention may be grounded to provide a ground for such supported equipment.

More particularly, support apparatus of the present invention may include a base, a receptacle for receiving and supporting an object, such as the above-noted equipment, a plurality of spaced apart buttresses connected to the base and receptacle, the buttresses mount the receptacles perpendicularly with respect to the base and spaced outwardly therefrom to cause force received by the receptacle from the supported object, such as the above-noted equipment, to be transferred and distributed to different portions of the base by the buttresses. The number of buttresses included on a base is dependent on the amount of weight to be distributed. At least a portion of the base may be made of electrically conductive material and provided with a ground connector for being connected to ground by a ground lead to provide a ground connection for the supported equipment. The ground lead may be sufficiently strong so as to secure the support apparatus to a retaining structure for security or seismic risks.

BRIEF DESCRIPTION OF THE DRAWINGS

FIG. 2 is a side elevational view of the support apparatus shown in FIG. 1;

FIG. 3 is an exploded view showing the elements comprising the support apparatus;

DESCRIPTION OF THE PREFERRED EMBODIMENT

Figure 1:
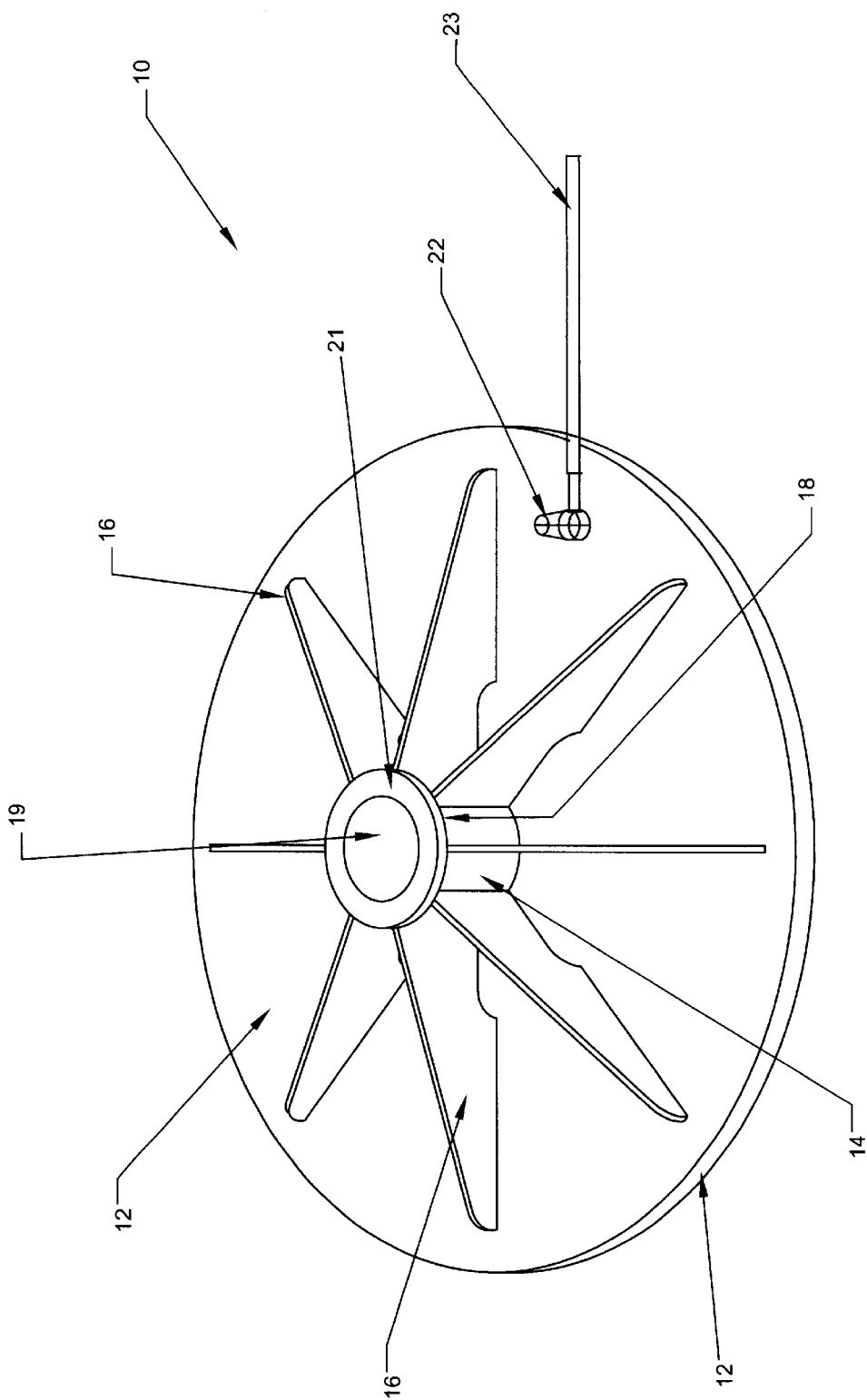
FIG. 1 is a perspective view of a support, or groundable support module, embodying the present invention.

Referring now generally to FIGS. 1, 2 and 2A, and in particular to FIG. 1, there is shown a support, support apparatus or module embodying the present invention and indicated by general numerical designation 10. The support 10 includes a base 12, a receptacle indicated by general numerical designation 14 and a plurality of radially disposed buttresses 16 extending radially outwardly from the receptacle 14. The base 12 is planar, circular and generally disk-like. The receptacle 14 includes a hollow cylinder 18 provided with a central bore 19 and the outer or upper portion of the cylinder 18 is provided with an outwardly extending annular collar 20 providing an upper or outer annular support surface 21. As will be best understood from FIG. 2, the buttresses are disposed perpendicularly to, and connected to, the base 12 and to the receptacle 14, particularly the receptacle cylinder 18, whereby the buttresses 16 mount the receptacle 14 to the base 12 but spaced outwardly or upwardly therefrom shown in FIG. 2. The receptacle 14, particularly the receptacle cylinder 18, is for receiving an object to be supported by the support 10, as described in detail below, and it will be understood that upon such an object being received within the receptacle 14 the object imparts a load or downwardly acting force to the receptacle which is transferred and distributed to different portions of the base 12 by the plurality of radially disposed buttresses 16; the downwardly acting load or force is indicated diagrammatically in FIG. 2 by arrow A.

In the preferred embodiment, the above-described base 12, receptacle 14 and buttresses 16, were made of a suitable electrically conductive material, such as by way of example and not by way of limitation, steel, galvanized steel, stainless steel, and expanded steel. Such components may be made separately of such electrically conductive material and formed into a unitary structure such as, for example, by welding or other metal joining techniques known to the art. Such integral forming of the support components provides an electrical ground path from the annular collar 20 through the cylinder 18, the buttresses 16, the base 10, the ground connector 22 and the ground lead 23 to a suitable ground In the preferred embodiment, FIGS. 1–3, a ground connector 22 is provided on the base 12 and is spaced from the receptacle 14. The ground connector 22 is for being connected electrically and mechanically to a ground lead 23 by welding known to the art as exothermic welding. As is known to the art, exothermic welding consists of a molecular weld accomplished using commercially available equipment widely used and available to the high voltage power industry and to the lightning protection industry. The exothermic weld is applied using a graphite mold with appropriately sized apertures machined into the mold to accept the grounding lead and the welding material. The mold is clamped to the groundable supporting foot of the upper surface of the planar structure. The ground lead is inserted into the mold. The weld cavity of the mold is stoppered by a welding disk. Welding powder consisting of copper oxide and aluminum is added to the cavity in sufficient quantity to form the bond and fill the mold. The mixture is ignited producing an exothermic reaction that produces molten copper and aluminum oxide slag. The molten copper melts the objects being connected together to form a molecular bond. There is no increase in electrical resistance in an exothermically welded connection as there is in typical pressure connections or with conventional welding.

To combat corrosion and ultraviolet degradation, the outer surfaces of the base 12, receptacle 14 and buttresses 16, except the outer or upper annular support surface 21 of the annular collar 20, may be coated with suitable corrosion and/or ultraviolet degradation resistant materials such as, for example, and not by way of limitation, polyvinyl chloride, vinyl, plastisol or corrosion and/or ultraviolet resistant or other degradation preventing materials known to the art and which may be suitably used to coat metal of the types noted above of which the components of the support 10 may be made.

Referring with further particularity to the configuration of the buttresses 16, and to the representative buttress indicated in FIG. 3 as buttress 16A, it will be understood that each buttress includes four edges as shown with regard to representative buttress 16A, namely, edges 25, 27 and 28. Edge 25 is for being connected to the receptacle 14, and more particularly is for being connected to the receptacle cylinder 18. Edge 27 is inclined angularly upwardly with respect to the base 12 and interconnects edges 25 and 28 and is provided at its outer portion with a convex curved outer portion 27a. Edge 28 interconnects the edges 25 and 27 and includes an inner straight portion 28a, an intermediate concave curved portion 28b and a straight outer portion 28a for being connected to the base 12.

As will be best understood from FIG. 2, by providing the buttresses 16 with edges 28 having the shape described above and shown in FIG. 3, a space, as shown in FIG. 2, is provided between the bottom of the receptacle 14, particularly the receptacle cylinder 18, and the base 12 which permits air, wind, or flowing water, to flow through the space so that the support 10 is less susceptible to movement or displacement by wind or flowing water striking the support.

Figure 4:
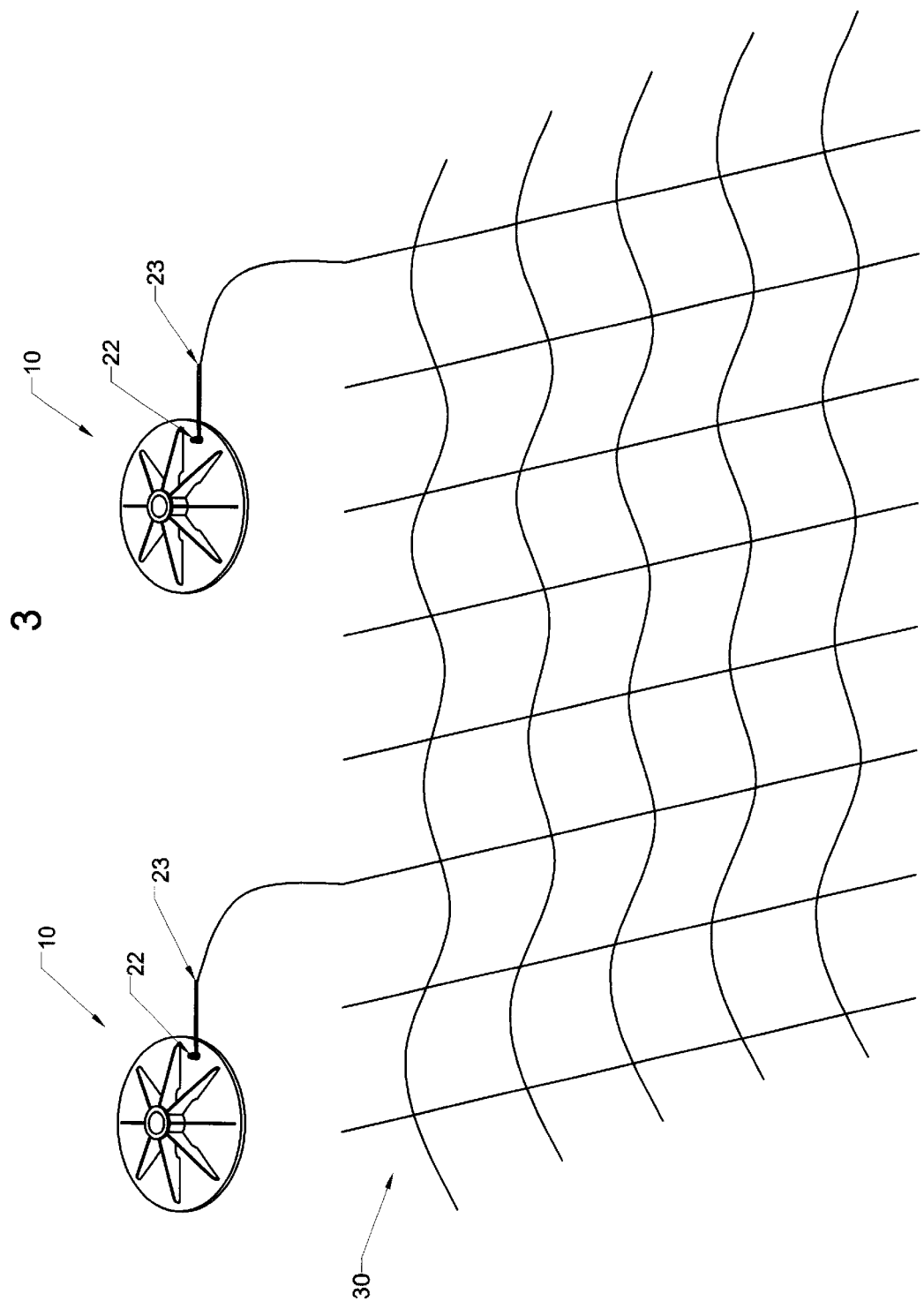
FIG. 4 is a diagrammatical illustration showing a plurality of the supports as support modules of the present invention connected to an equi-potential mesh or net ground field.

Referring now to FIG. 4, this FIG, illustrates diagrammatically the connection of a plurality, a pair being shown, of supports or modules 10 embodying the present invention, to a equi-potential mesh or net ground field indicated diagrammatically by general numerical designation 30 and which is of a type known to the art and typically found at telecommunication sites constructed at ground level; the supports 10 are connected to the equi-potential mesh or net ground field by ground connectors 22 and ground leads 23.

Figure 5:
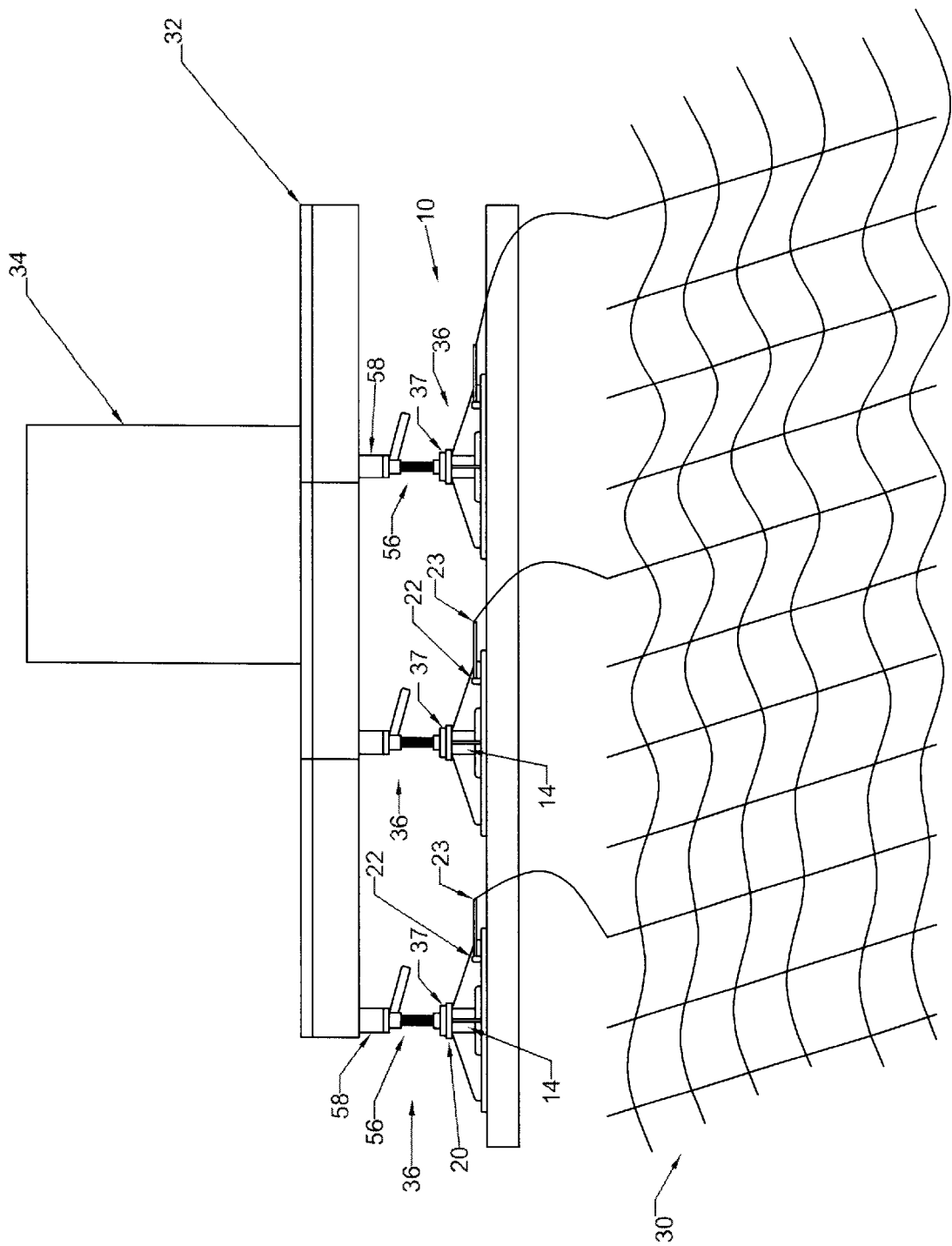
FIG. 5 is a diagrammatical illustration showing a plurality of supports, or support modules, of the present invention supporting a telecommunication platform or frame which in turn is shown supporting an equipment cabinet, the groundable supports are shown connected to an equi-potential mesh or net ground field as in FIG. 4.

A further embodiment of the support apparatus of the present invention is illustrated in FIG. 5. This embodiment includes a plurality of supports 10 supporting a telecommunication equipment platform or frame indicated by general numerical designation 32. The frame 32 is shown, by way of illustration, supporting an equipment cabinet indicated by general numerical designation 34. The equipment cabinet 34 may contain, for example, the above-noted telecommunication equipment and other equipment noted hereinabove in the Background of the Invention. Frame 32 may be provided with a plurality of outwardly extending support members indicated by general numerical designations 36 which may be provided with generally annular support collars 37 which, it will be understood, electrically and mechanically engage the collars 20 provided on the receptacles 14 of the supports 10. As shown generally in FIG. 5, but described in detail below with regard to FIG. 8, the outwardly extending support members 36 include outer portions (not shown in FIG. 5) received within the central bores 19 (FIG. 1) of the receptacles 14 to cause the supports 10 to support the frame 32 which in turn supports the equipment cabinet 34. In FIG. 5, the supports 10 are shown residing on a depiction of filled, graded earth and the supports 10, as shown in FIG. 4 and described above, may be suitably connected by ground connectors 22 and ground leads 23 to the equi-potential mesh or net ground field 30.

Figure 6:
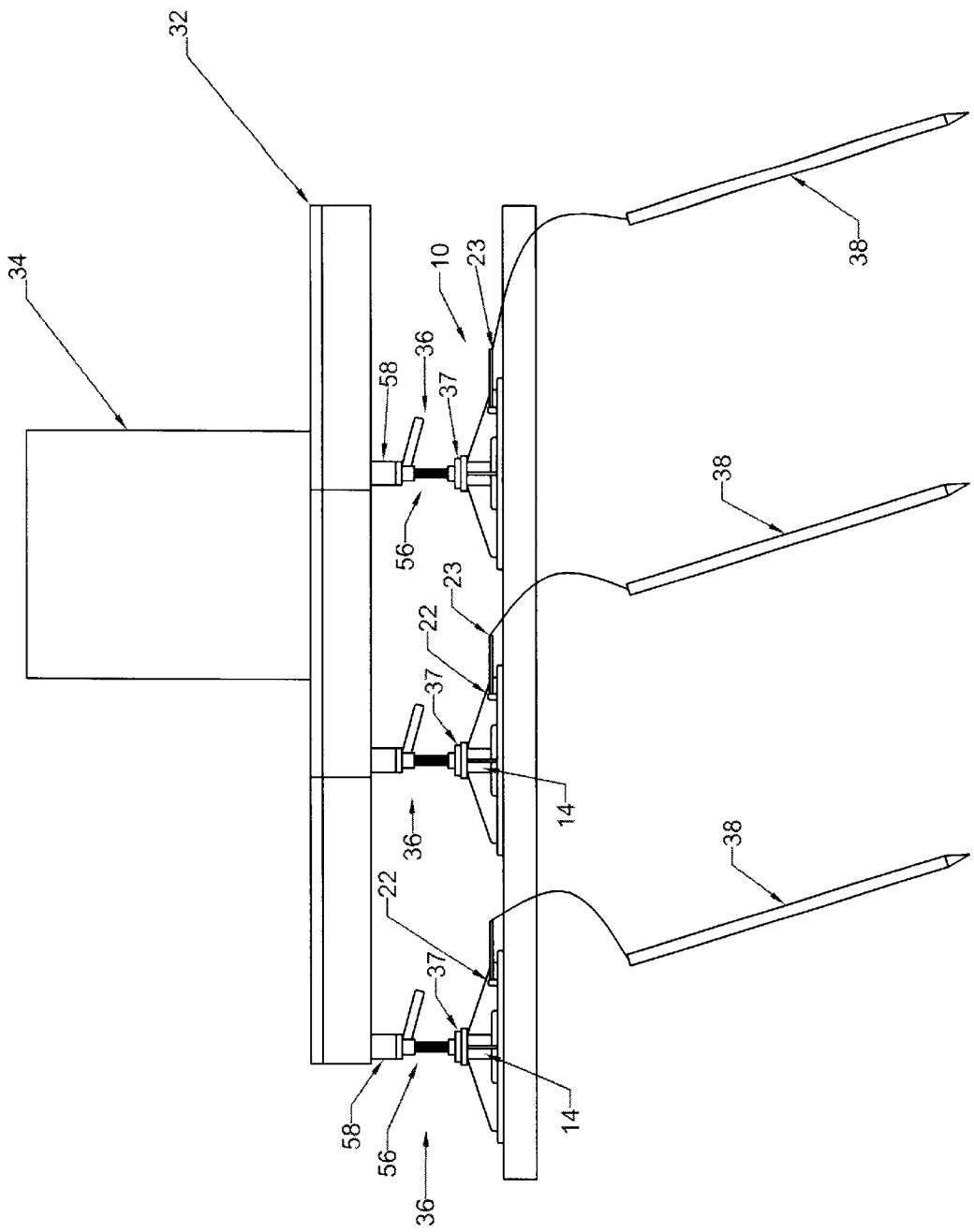
FIG. 6 is a view similar to FIG. 5 but showing a plurality of supports of the present invention connected to a plurality of ground rods.

FIG. 6 is a view similar to FIG. 5 but showing the support apparatus of the present invention, including the supports or modules 10, connected by ground connectors 22 and ground leads 23 to a plurality of ground rods 38 of the type typically buried or driven into the ground to provide ground connection. Otherwise, it will be further understood that the elements shown in FIG. 6 which have the same numbers as elements shown in FIG. 5 have the same structure and perform the same function.

Figure 7:
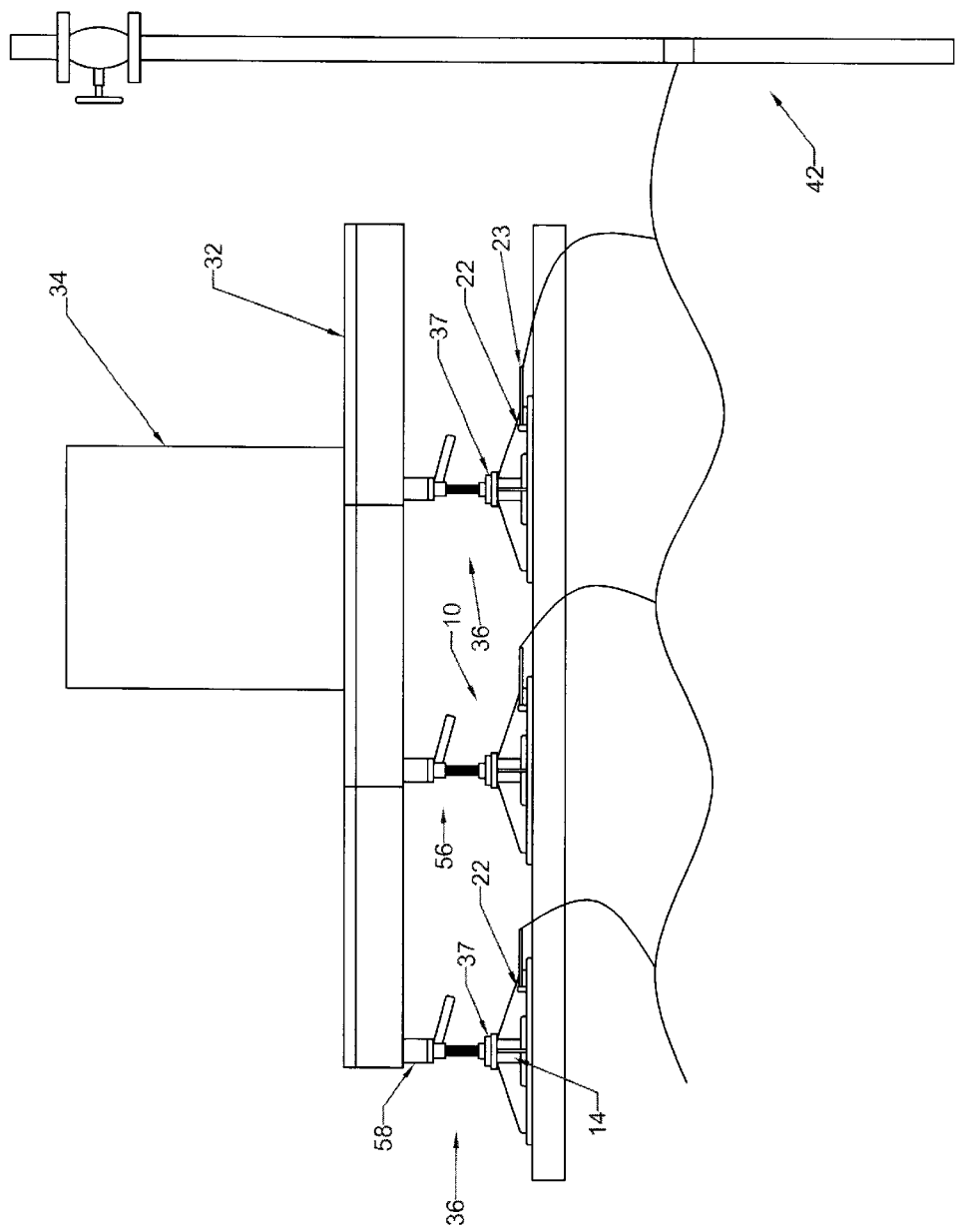
FIG. 7 is a view similar to FIGS. 5 and 6 but showing a plurality of the supports of the present invention connected to a cold water pipe.

FIG. 7 illustrates the support apparatus of the present invention including a plurality of supports or modules 10 shown connected by ground connectors 22 and ground leads 23 connected to a cold water pipe 42 for grounding. The grounding application illustrated in FIG. 7 is sometimes referred to in the art as a halo application present in many roof top applications and which includes the cold water pipe 42. It will be understood that the elements shown in FIG. 7 which have been given the same numerical designations as elements shown in FIGS. 5 and 6 have the same structure and perform the same function as the elements shown in FIGS. 5 and 6 and described above FIG. 8 shows in detail certain features of certain structural elements comprising the support apparatus of the present invention, particularly, the manner in which the outwardly extending support members 36 provided with the annular support collars 37 that are supported by the annular support collars of the receptacles 14 of the supports 10. From FIG. 8, it will be understood that the central bore 19 of the cylinder 18 has a length L1 and that the outwardly extending support member 36 of the frame 22 (FIGS. 5–7) includes an outer portion 46, an inner portion 48 and an intermediate portion therebetween from which the annular support collar 37 extends outwardly. The annular support collar 37 includes an outer annular support surface 50. It will be further understood from FIG. 8 that the outer portion 46 of the frame outwardly extending member 36 is provided with a length L2 that is less than the length L1 of the receptacle bore 19. Accordingly, it will be understood that upon the outer portion 46 of the frame support member 36 (FIGS. 5–7) being inserted into the receptacle bore 19, the annular support surface 50, on the outwardly extending support member 36, will mechanically and electrically engage the outer support surface 21 provided on the support collar 20 and the outer or bottom end of the outer portion 46 of the outwardly extending frame support member 36 will not engage the bottom of the receptacle 14. Thus, it will be understood that the load or downwardly acting force applied to the support 10 by the outwardly extending frame support member 36 is imparted to the receptacle 14 and, as described above, is transferred and distributed by the buttresses 16 to different portions of the base 12. It will be further understood from FIG. 8 that upon being placed in both electrical and mechanical engagement with the support 10 by the annular support surfaces 50 and 46, the outwardly extending frame support member 36, the frame 32 (FIGS. 5–7) is grounded through the support 10 as described above and in particular is grounded by the ground connector 22 and ground lead 23 to a ground such as the ground mesh 30 shown in FIGS. 4 and 5, the ground rods 38 shown in FIG. 6 and the cold water pipe 42 shown in FIG. 7. Further, the frame 32 (FIGS. 5–7), the cabinet 34 and equipment contained in the cabinet may be suitably connected electrically to the frame 32 and to ground through the frame 30, supports 10 and ground leads 23.

Referring again to FIGS. 5–7, it will be understood in the preferred embodiment the outwardly extending support members 36 and the frame 32 were made of a suitable electrically conductive material such as, for example, galvanized steel. Further, FIGS. 5–7, it will be understood that the outwardly extending frame support members 36 include upper threaded portions 56 which may be threaded suitably into and out of suitable internally threaded frame post members 58 to adjust, for example level, the frame 32 for supporting the equipment cabinet 34 as shown in FIGS. 5–7.

Figure 9:
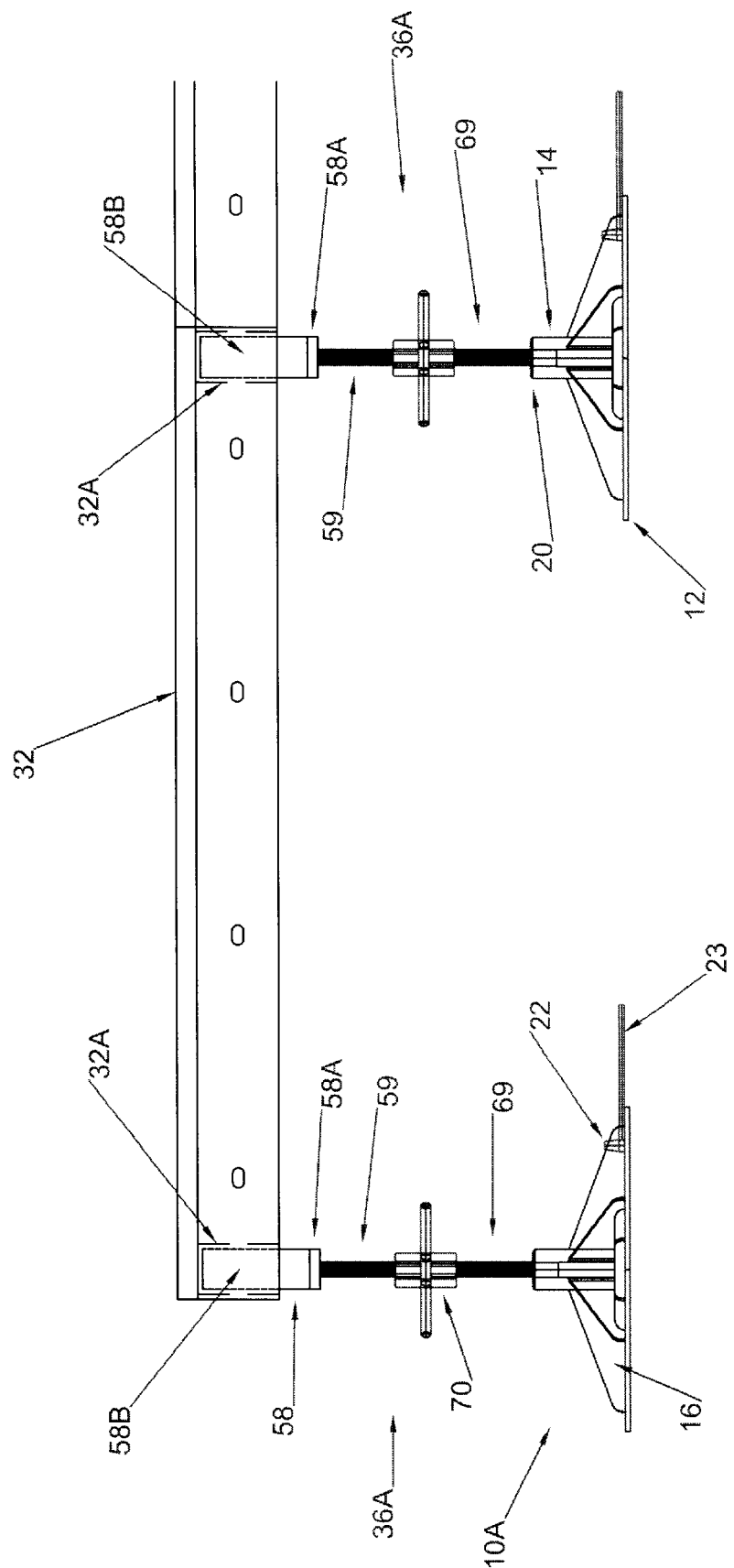
FIG. 9 is a side view of an embodiment of a plurality of equipment frames supported upon threaded frame support members supported by grounded bases.

Shown in FIG. 9 is another preferred embodiment of the grounded support modules of the present invention, indicated with the general numerical designation 10A. FIG. 9 depicts diagrammatically a plurality, a pair being shown, of the frames 32 upon frame support members 36A that provide a leveling function. In this embodiment, each frame support member 36A has an upper threaded portion 59 and a lower threaded portion 69 with these threaded portions joined at one end to a leg adjusting block 70.

The upper threaded portion 59 will thread into and out of the end 58A of suitably internally threaded frame post member 58. Frame post member 58 is preferably a hollow member, so as to have an interior space into which the upper threaded portion 59 of frame support 36A can fit. The threaded end 58A of frame post member 58 may have a threaded nut welded outside that end 58A, or a threaded nut may be secured inside the end 58A of that frame support member 58.

The end 58B of frame support member 58 opposite the threaded end, hereinafter called the frame end 58B, has a shape that fits into a receiving area 32A on the frame 32. That receiving area 32A having a shape that corresponds to that of the frame end 58B of the frame post member 58. For example, the frame end 58B may have a square shape and the receiving area 32A on the frame would be a larger square shaped area. Using such corresponding shapes allows the frame end 58B to fit within the receiving area 32A, preferably snugly, but disallows the frame end from being rotated within that receiving area 32A. By way of explanation, and without limitation, a round shape would not be suitable, because a round frame could be rotated within the receiving area. The preferred embodiment of the frame end 58B may be detachably secured to the frame 32 or the end 58B may be secured removably within the receiving area 32A, or the frame 32 may rest upon the frame end 58B of the detachable frame post member 58 without being secured. The lower threaded portion 69 of frame support 36A is threaded suitably to turn into and out of suitable internally threaded support collar 20. In the preferred embodiment, the upper threaded portion 59 and the lower threaded portion 69 of the frame support 36A have threads that are cut in opposite directions. By mean of threads so cut, when the leg adjuster block 70 is turned one way, then both the upper and lower threaded portions will thread out of post member 58 and collar 20, which raises the frame 32 away from the base 12. By that same arrangement of the threads, when the leg adjuster block 70 is turned in the opposite direction, then the upper 59 and lower threaded 69 portions will thread into post member 58 and collar 20, which will reduce the height of the frame 32 above the base 12. The threading on the upper portion 59 being opposite of that on the lower portion 69 commonly is known as left-handed and right-handed threads. By means of these threads, the frame support member 36A provides the function of leveling, or of height adjustment, for the equipment frame 32, and as well for a plurality of frames for supporting various equipment thereon.

Figure 8:
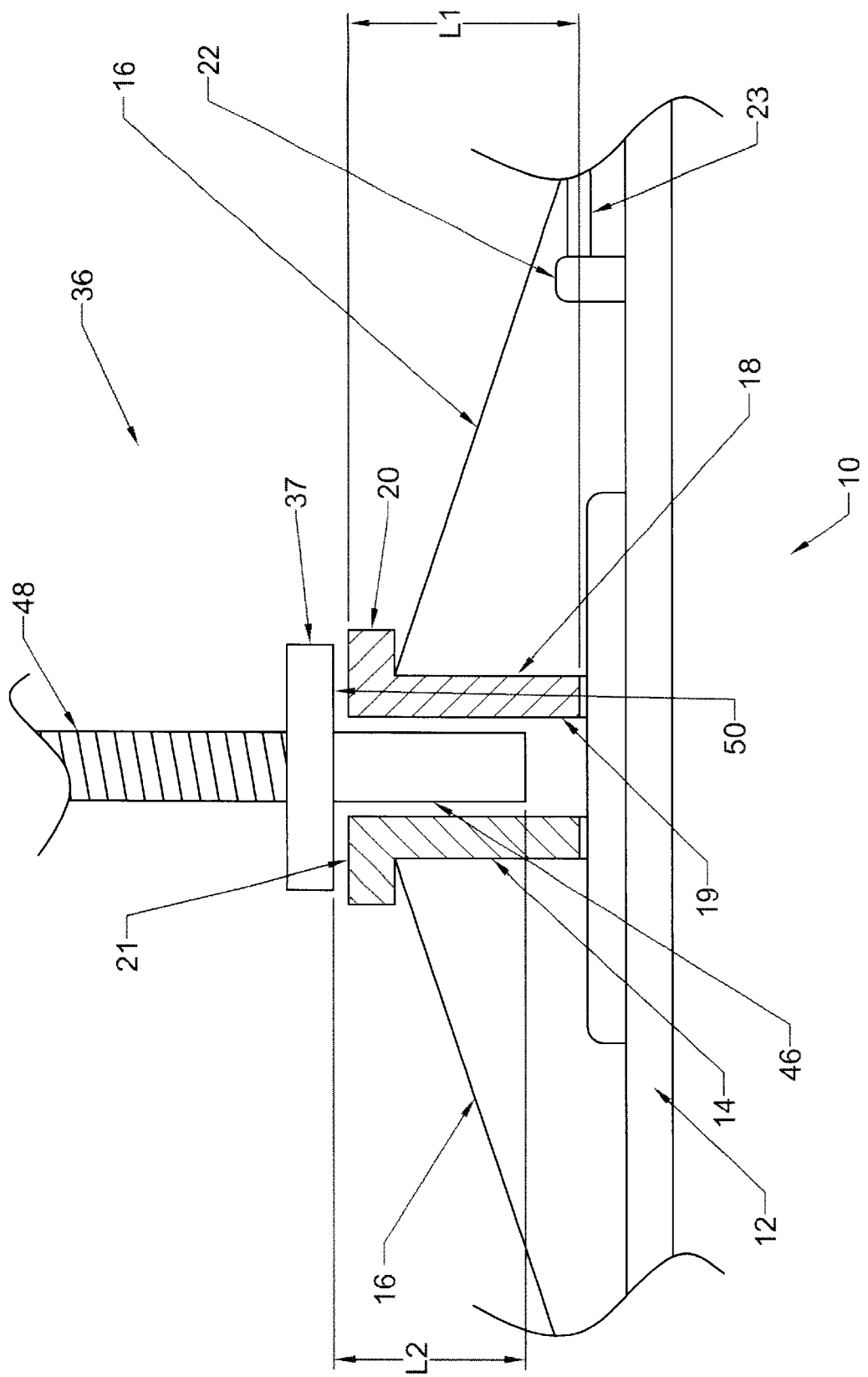
FIG. 8 is a detailed showing of how the support of the present invention transfers and distributes force received from supporting an object to different portions of the base of such support.
Figure 10:
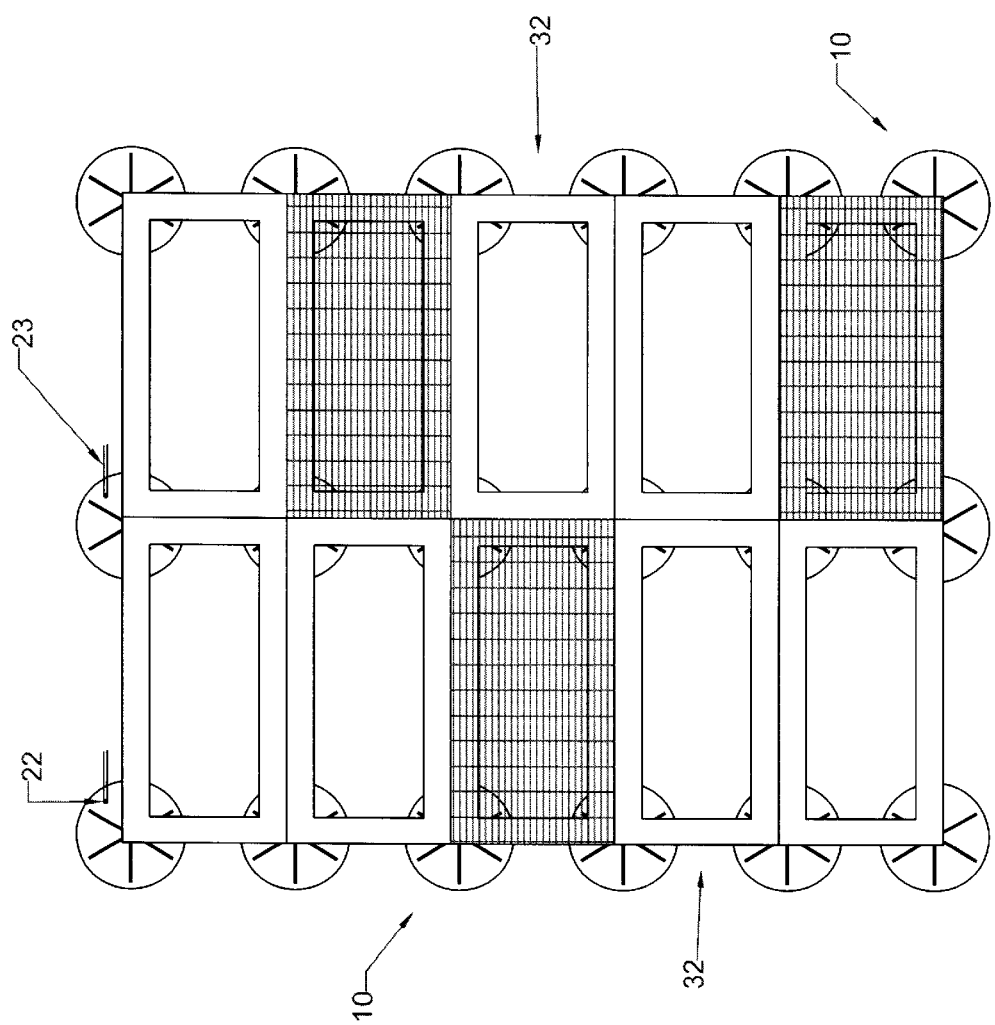
FIG. 10 is an overhead view of a plurality of support modules.

A suitable application would utilize a plurality of frames 32, secured together, that rest upon frame support members 36A and upon bases 12, a pair being shown in FIG. 9, with the frames 32 appropriated adjusted for leveling and height. Thus, a plurality of generally-rectangular frames, supported at each corner by frame support members 36A and bases 12 would provide any size of grounded equipment platform. Referring to FIG. 10 that depicts from an overhead view, the connection of a plurality of support modules 10 or 10A embodying the present invention. That arrangement would be useful to provide what is shown in FIGS. 5–7, and provide a useful leveling function for this grounded equipment platform. The preferred embodiment shown in FIG. 9, may be coated with suitable corrosion and/or ultraviolet degradation resistant materials made from electrically conductive material, so as to provide both a mechanical connection and a grounding function. However, the threaded portions 59 and 69 would not be coated, such as with PVC. Also, the embodiment in FIG. 9 does not require the outer support surface 21 on the support collar 20 or the annular support collar 50 on the frame support member 36 as shown in FIG. 8. The embodiment in FIG. 9 has internal threads on the receptacle bore 19, and the plastic, or similar, coating that is provide on the base 12 preferably extend up to the opening of the threaded receptacle bore, into which the lower threaded portion 69 is received. The conductive metal parts of the frame support member 36A, specifically the lower threaded portion 69 will engage the internally threaded receptacle bore 19 of the support 10A. That threaded bore 19 and portion 69 in FIG. 9 conform to the lengths L1 and L2 respectively, as described above for the embodiment in FIG. 8.

It will be further understood that in accordance with the further teachings of the present invention that the present invention may include the ground lead 23 (FIGS. 1 and 5–7, and FIG. 9) and that the ground lead 23 may be of sufficient strength to anchor or secure the support or modules 10 to retaining structure, such as a grounding fixture, structural member, or other permanent building retaining structures, or parapet walls found for example on the top or roof of a building, to prevent the support 10 of the present invention from being unintentionally moved, such as by wind, flowing water, seismic activity, or storms. In one embodiment such ground lead was made of tin-coated, solid copper and had a diameter of 0.258 inch. The above-noted exothermic welding connection between the ground lead 23 and the ground connector 22 has been found to be sufficiently strong to maintain the support 10 to the above-noted retaining structure.

It will be understood by those skilled in the art that many variations and modifications may be made in the present invention without departing from the spirit and the scope thereof.

What is claimed is:

1. Support apparatus, comprising:
    a planar base;
    a hollow receptable for receiving an object; and
    a plurality of radially spaced apart buttresses having a first end connected to said base and a second end connected to an outer surface of said receptacle, said buttresses mounting said receptacle separate from and spaced above, said base and spaced outwardly from said receptacle to cause force received by said receptacle from supporting said object to be transferred and distributed to different portions of said base by said buttresses; and wherein at least said base, said receptacle and said buttresses are made of electrically conductive material and whereby the spacing of said receptable above said base permits the passage of air, wind, or water to decrease susceptiblity to movement of said apparatus.

2. The apparatus according to claim 1 whereby said receptacle is connected to said buttresses and wherein said base is connected to said buttresses and said object is connected to ground through said receptacle being connected to said buttresses being connected to said base having a ground connector for being connected to earth ground.

3. The apparatus according to claim 2, wherein said ground connector is spaced from said receptacle and is adapted to be connected to a ground lead by exothermic welding.

4. The apparatus according to claim 1 wherein said receptacle comprises a cylinder and is provided with a central bore for receiving said object, wherein said buttresses are planar and are disposed radially outwardly from said cylinder, and wherein said buttresses mount said cylinder to said base.

5. The apparatus according to claim 4 wherein said cylinder has an outer portion adjacent said central bore and wherein said outer portion is provided with an outwardly extending annular collar including an outer annular support surface perpendicular to said base and co-extensive with said central bore.

6. The apparatus according to claim 4 wherein said support apparatus further comprises a frame for supporting equipment, said frame provided with at least one outwardly extending member sized and shaped for receipt in said central bore, said outwardly extending member comprising said object to be supported by said receptacle.

* * * * *